US012702151B2

(12) United States Patent
Morend et al.

(10) Patent No.: US 12,702,151 B2
(45) Date of Patent: Aug. 11, 2026

(54) METHOD TO CHECK A COFFEE BEANS ROASTING SYSTEM

(71) Applicant: SOCIETE DES PRODUITS NESTLE S.A., Vevey (CH)

(72) Inventors: Joel Morend, Chatonnaye (CH); Flavien Florent Dubief, Champagne (CH); Thomas Rudi S. Degreef, Grimbergen (BE); Michiel Alexander Celis, Deurne (BE); Rien Denise M. Lemmens, Boechout Antwerp (BE); Maxime Baekelandt, Ghent (BE)

(73) Assignee: Société des Produits Nestlé S.A., Vevey (CH)

(*) Notice: Subject to any disclaimer, the term of this patent is extended or adjusted under 35 U.S.C. 154(b) by 386 days.

(21) Appl. No.: 18/258,024

(22) PCT Filed: Dec. 6, 2021

(86) PCT No.: PCT/EP2021/084438
§ 371 (c)(1),
(2) Date: Jun. 16, 2023

(87) PCT Pub. No.: WO2022/135893
PCT Pub. Date: Jun. 30, 2022

(65) Prior Publication Data

US 2024/0000126 A1 Jan. 4, 2024

(30) Foreign Application Priority Data

Dec. 22, 2020 (EP) .................................... 20216280

(51) Int. Cl.
*A23N 12/12* (2006.01)
*B01D 46/00* (2022.01)
(Continued)

(52) U.S. Cl.
CPC ....... *A23N 12/125* (2013.01); *B01D 46/0086* (2013.01); *B01D 53/0407* (2013.01);
(Continued)

(58) Field of Classification Search
CPC ...... A23N 12/125; A23N 12/08; A23N 12/10; B01D 46/0086; B01D 53/0407;
(Continued)

(56) References Cited

U.S. PATENT DOCUMENTS 4,701,193 A * 10/1987 Robertson .......... B01D 46/4245 96/380
9,301,543 B2 4/2016 Ludwig
(Continued)

FOREIGN PATENT DOCUMENTS

CN 105078239 11/2015
CN 106604646 4/2017
(Continued)

*Primary Examiner* — An T Nguyen
(74) *Attorney, Agent, or Firm* — Thorpe North & Western, LLP

(57) ABSTRACT

The invention concerns a method to check a roasting system (10), said system comprising: a roasting apparatus (2), said apparatus producing smoke, and—a smoke treating unit (3) configured to treat the flow of smoke produced by the roasting apparatus, and comprising a filtering device (221) and a couple of temperature sensors (24, 26) configured to measure temperatures of the flow of smoke upstream and downstream the filtering device (221), wherein, during a roasting operation, the method comprises the steps of:—comparing the performances of the temperatures during at least a period of time of the roasting operation, and—if the performances are similar along time, then displaying an alarm.

13 Claims, 6 Drawing Sheets

(51) Int. Cl.
*B01D 53/04* (2006.01)
*G01K 3/14* (2006.01)

(52) U.S. Cl.
CPC ........... *B01D 53/0454* (2013.01); *G01K 3/14* (2013.01); *B01D 2253/102* (2013.01); *B01D 2257/708* (2013.01)

(58) Field of Classification Search
CPC .......... B01D 53/0454; B01D 2253/102; B01D 2257/708; G01K 3/14; A23F 5/046
See application file for complete search history.

(56) References Cited

U.S. PATENT DOCUMENTS

2013/0276637 A1* 10/2013 Stordy ..................... A23F 5/02 99/348
2016/0016181 A1 1/2016 Lathrop et al.
2022/0225656 A1* 7/2022 Ceccaroli ............... A23N 12/08
2022/0322722 A1* 10/2022 Bosmans ............... A23N 12/08
2023/0180814 A1* 6/2023 Dubief ...................... A23F 5/04 432/49

FOREIGN PATENT DOCUMENTS

| | | |
|---|---|---|
| CN | 108552559 | 9/2018 |
| CN | 111820309 | 10/2020 |
| KR | 101104180 | 1/2012 |
| KR | 101306992 | 9/2013 |
| KR | 2004694580000 | 10/2013 |
| RU | 2461815 | 9/2012 |
| WO | 9831974 | 7/1998 |
| WO | 9923888 | 5/1999 |
| WO | 2007038113 | 4/2007 |
| WO | 2012059484 | 5/2012 |
| WO | 2020084134 | 4/2020 |
| WO | 2020112951 | 6/2020 |

* cited by examiner

METHOD TO CHECK A COFFEE BEANS ROASTING SYSTEM

CROSS REFERENCE TO RELATED APPLICATIONS

The present application is a National Stage of International Application No. PCT/EP2021/084438, filed on Dec. 6, 2021, which claims priority to European Patent Application No. 20216280.6, filed on Dec. 22, 2020, the entire contents of which are being incorporated herein by reference.

FIELD OF THE INVENTION

The present invention relates to relates to apparatuses for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired components all together, in particular the usual roasted coffee aroma, but also undesired less safe volatile organic compounds (VOC) VOC such as pyridine, 2-furane methanol, caffeine furfural, formaldehyde, acetaldehyde, . . . and particulate matter ($PM_{2.5}$, $PM_{10}$), . . . .

When roasting is implemented in manufacturing places producing important quantities of roasted beans, generally all the conditions for catching unsafe components are supplied. But, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to stop the emission of smoke from the roaster to avoid any healthy issue for people present in the shop. The existing solutions consist in destroying contaminants, such as an afterburner enabling thermal oxidation of contaminants or a catalytic afterburner or retaining contaminants inside the apparatus like mechanical filters (metallic sieves or paper filter), an active carbon filter or an electrostatic precipitator or combination thereof.

When an active carbon filter is used, the active carbon substance, usually hold in a bag, must be regularly changed to be regenerated. During this operation, the old bag of active carbon is removed and a new fresh one is introduced. During this operation, it may happen that the operator removes the old bag but forgets to introduce the new one. This error can be emphasised by the fact that the smoke filter can comprise a combination of several different filters, all of them requiring a different cleaning treatment.

In the case of an active carbon filter, the absence of the active carbon bag inside the filter does not prevent the roasting operation, as the roasting emissions can freely flow through, and the operator will not realise that the smoke is not treated before several roasting operations are implemented, when malodorous smells will appear, which is not desired in a shop, coffee or restaurant.

SUMMARY OF THE INVENTION

An object of the invention is to address the above existing problem or similar problems.

In particular, an object of the invention is to address the problem of informing the operator that a part of the smoke filter such as the active carbon bag is absent.

It would be advantageous to provide a method to enable the roasting operator to be informed of the absence of a part of the smoke filter without adding sensors specific to that part.

In a first aspect there is provided a method to check a roasting system, said system comprising:

- at least one roasting apparatus, said apparatus producing smoke during the heating of coffee beans, and
- at least one smoke treating unit configured to treat at least a part of the flow of smoke produced by the at least one roasting apparatus, said smoke treating unit comprising at least one removable filtering device,
- a smoke driver configured to drive smoke from the roasting apparatus to said at least one filtering device,
- wherein the at least one smoke treating unit comprises at least one couple of a first and a second temperature sensors, the first temperature sensor being configured to measure the temperature $T_1$ of the flow of smoke upstream said removable filtering device and the second temperature sensor configured to measure the temperature $T_2$ of the flow of smoke downstream said removable filtering device,
- wherein the method comprises the steps of:
- operating the roasting apparatus in order to produce hot gas,
- monitoring the first and the second temperatures measured by one of the couples of a first and a second temperature sensors during at least a period of time of said operation,
- observing the difference of behaviours of the monitored temperatures along time,
- comparing said observed difference of behaviours to a predetermined difference of behaviours corresponding to the presence of said at least one removable filtering device between the two temperature sensors,
- if the observed difference of behaviours diverges from the predetermined difference of behaviours, then displaying an alarm.

The objective of the method is to check a roasting system is working properly and in particular to check that the smoke treating unit is working properly, precisely to check that no removable filtering device of the smoke treating unit is missing.

This roasting system, in which the method is applied, comprises two types of apparatuses:

- first, the roasting apparatus in which beans are heated to be roasted and, secondly, the smoke treating unit configured to treat the smoke generated inside the first roasting apparatus during the roasting of the coffee beans.

The two apparatuses can be sub-parts of one single main system or alternatively, the two apparatuses can be conceived as separated modules cooperating together during the process of roasting.

As described below, the system can comprise several roasting apparatuses and/or several smoke treating units.

Any type of roasting apparatus can be used. In the roasting apparatus, coffee beans are heated and preferably mixed to homogenise heating through the beans. Accordingly the roasting apparatus comprises a chamber to hold the beans and heating means to heat the coffee beans.

The heating means can be a burner (meaning combustion) fed by natural gas, liquefied petroleum gas (LPG) or even wood. Alternatively the heating means can be an electrical resistor, a ceramic heater, a halogen source, a source of infrared or of microwaves.

Preferably the heating means is electrically powered so that the air contaminants produced during the roasting are contaminants generated from the heating of coffee beans themselves only and not from the burning of gases as it happens when the heating means is a gas burner using natural gas, propane, liquefied petroleum gas (LPG) or even wood.

The mixing of the beans during the roasting operation can be obtained with a fluidic bed of hot air or mechanically with stirring blades or a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The roasting apparatus comprises an outlet from which smoke produced during the roasting operation can be evacuated.

In one embodiment, the system can comprise several roasting apparatuses, the outlets of these different roasting apparatuses being configured to be mixed together before being treated by one or several smoke treating units.

Generally, the smoke treating unit of the system comprises a smoke inlet configured to cooperate with this smoke outlet of the roasting apparatus and to collect smoke through this smoke inlet.

The smoke treating unit treats the smoke in order to reduce or eliminate harmful contaminants the smoke contains. The smoke treating unit comprises at least one filtering device configured to destroy or trap contaminants. This unit can comprise:

- at least one active treating filter that destroys contaminants inside the apparatus, such as an afterburner enabling thermal oxidation of contaminants or a catalytic afterburner, or
- at least one passive treating filter that retains contaminants inside the apparatus like mechanical filters (metallic sieves, a high efficiency particulate accumulator (HEPA) or paper filter), an active carbon filter or other adsorbent filter, or an electrostatic precipitator, or a combination of the above units.

Usually, the smoke treating unit comprises at least one removable filtering that is cleanable, disposable or able the be regenerated, preferably comprised in the list of: a metallic sieve, an electrostatic precipitator, a HEPA filter, a paper filter, cotton, cloth, an adsorbent material filter and combinations thereof.

These types of filtering devices are removable from the smoke treating unit to be cleaned or disposed and replaced by new filters. It is particularly the case for the passive treating filters:

- metallic sieves and plates of electrostatic precipitators are removed to be washed and then re-installed inside the smoke treating unit,
- HEPA, paper, cotton, cloth filters are removed to be disposed and new papers are installed inside the smoke treating unit,
- bags of adsorbent materials are removed from the active carbon filter to be regenerated and new bags are installed inside the smoke treating unit.

When the smoke treating unit comprises several filtering devices, they are usually positioned in series along the direction of the flow of smoke. Usually, devices for filtering particulate matters (PMs) are positioned upstream the devices for filtering volatile organic compounds (VOCs).

In one preferred embodiment the smoke treating unit can comprise at least one adsorbent filter, preferably an active carbon. This type of filter adsorbs VOCs. This filter requires specific operating conditions in terms of temperature and for this reason a temperature sensor is frequently positioned close to this filtering device.

The active carbon filter comprises a removable active carbon bag. This bag contains the active carbon that adsorbs VOCs and this bag must be removed when the active carbon has reached its maximal adsorption capacity and replaced by a fresh active carbon holder. Usually the bag is made of a material that enables the smoke to flow through but retains the active carbon that is usually under the form of granules. The removable bag is positioned inside a dedicated area of the smoke filtering unit.

The smoke is driven inside the smoke treating unit and the filtering devices by means of a smoke driver configured to circulate smoke through the smoke treating unit from the smoke collecting device to an outlet of the smoke treating unit. At the outlet, the smoke can be safely released inside the atmosphere of a room since the contaminants have been trapped.

The smoke driver is usually a fan driving the smoke to the outlet.

Generally the smoke driver is part of the smoke treating unit. Preferably it is a fan positioned next to the outlet of the smoke treating unit. As a result, the fan is not contaminated by the non-treated smoke and its maintenance is easier.

Alternatively, the smoke driver can be positioned outside the smoke treating unit; then the driver and the unit are connected through ducts.

Alternatively, the smoke driver can be the fan of the roasting apparatus that pushes the smoke in direction the smoke treating unit.

The smoke treating unit comprises at least one couple of a first and a second temperature sensors. The first temperature sensor is configured to measure the temperature $T_1$ of the flow of smoke upstream at least one of the removable filtering devices and the second temperature sensor is configured to measure the temperature $T_2$ of the flow of smoke downstream said removable filtering device.

The terms "downstream" and "upstream" are understood according to the flow of smoke through the smoke treating unit and the filtering device.

The temperature sensors can be any sensor configured to measure a temperature. This sensor can be configured for the measure of temperature only or this sensor can be a multi-sensor component able to measure various other parameters than temperature like humidity, pressure, VOCs content. Examples of such sensors are air or gas sensors.

In order to check the roasting system and in particular the presence, by default the absence, of a removable filtering device, the method comprises the steps of:

- operating the roasting apparatus in order to produce hot gas,
- observing the difference of behaviours of the monitored temperatures along time,
- comparing said observed difference of behaviours to a predetermined difference of behaviours corresponding to the presence of said at least one removable filtering device between the two temperature sensors,
- if the observed difference of behaviours diverges from the predetermined difference of behaviours, then displaying an alarm.

It has been observed that when the hot smoke of the roasting apparatus or any other hot gas, in particular hot air, is passed through one filtering device, the second temperature $T_2$ measured at the second temperature sensor just downstream this filtering device increases far slower than the first temperature $T_1$ measured at the first temperature $T_1$ just upstream this filtering device; it is due to the absorption of the heat energy of the smoke by the filtering device, this one acting as a thermal buffer. On the contrary, when the filtering device is not present, the temperatures monitored at the two sensors increase in a very similar manner almost at the same moment, the smoke traversing rapidly the empty space between the two temperature sensors.

Consequently, if similar behaviours of the monitored temperatures $T_1$ and $T_2$ are observed, the risk the removable filtering device is not present between the two temperature sensors of the couple is high and an alarm can be displayed to request the operator to check the presence of the filtering device inside the smoke treating unit once the roasting operation is stopped. In the case where several filtering devices are present between the two sensors of the same couple of temperature sensors, if only one of these several filtering devices is absent, then the two temperatures measured at the two sensors may not increase rapidly in a very similar manner (in particular if there is still a filtering device that is able to create a thermal buffer for heating energy between the temperature sensors), yet, the difference of behaviours of the temperatures do still deviate from the difference of behaviours of the temperatures when all the filtering devices are present. In that situation, the deviation of the difference of behaviours from the predetermined difference of behaviours, that corresponds to the normal presence of all removable filtering device between the two temperature sensors, is the sign that at least one filtering device may be missing and an alert can be displayed.

Consequently, the present method enables the detection of a missing removable filtering device inside the smoke treating unit and can alert the operator.

The step of operating the roasting apparatus in order to produce hot gas can be a coffee beans roasting operation, an operation of pre-warming of the roasting apparatus or an operation of initialization of the filtering device.

Whatever the operation, hot gas is produced by operating the heating means of the roasting apparatus. If coffee beans are present in the chamber, the hot gas will be the smoke produced by the heating of the beans. If no coffee beans are present in the chamber, the hot gas will be hot air. That can happen during an operation of pre-warming of the roasting system or an operation of initialization of the filtering device when this filtering device is introduced for the first time in the smoke treating unit, for example after a maintenance or replacement operation. Usually, when the method is applied while operating a coffee beans roasting operation, this roasting operation is the first operation after a maintenance operation of the smoke treating unit, preferably maintenance of the at least one filtering device.

Indeed, it is important to know from the first operation implemented after a cleaning or maintenance operation of the smoke treating unit that at least one of the filtering devices is absent.

In addition, the method is all the more efficient if the smoke treating unit is at ambient temperature at the beginning of the step of monitoring the temperatures $T_1$ and $T_2$. The operator can be immediately informed of the absence of a part of the filtering device and can be prevented from launching a new roasting operation without having checked, and if necessary re-installed, the filtering device inside the smoke filtering unit.

Usually, in the method, the pre-determined difference of behaviours is set according to the nature of the at least one removable filtering device positioned between the first and the second temperature sensors of the couple.

As mentioned above, filtering devices can be of various natures in terms of design and materials (simple and thin metallic sieve, large bag of material adsorbent, metallic electrode plates of electrostatic precipitator, . . . ) with the effect of retaining the flow of smoke differently and presenting different heat capacity. Accordingly, to determine if the filtering device(s) designed for the smoke filtering device is/are present between the temperature sensors, the method is applied in reference n to the pre-determined difference of behaviours corresponding to that filtering device(s).

The predetermined difference of behaviours corresponding to the presence the removable filtering device(s) between the two temperature sensors can be predetermined by experimentations during roasting operations. Machine learning can also be applied based on these experimentations.

In one preferred embodiment, different predetermined differences of behaviours are predetermined depending on the type of roasting operations implemented in the roaster.

By type of roasting operation, it is meant the type of temperature profile versus time applied to the beans in the roasting apparatus. In a high level approach, three general types of roasting operations can be defined corresponding to three usual levels of roasting of the coffee beans that are light, medium or dark. These three types of roasting operation differ by their time length and the level of temperature at the end of the operations, the dark level roasting being obtained for the longer time at the higher final temperature, whereas the light level roasting is obtained for the shortest time at the lower final temperature. In a more precise approach, the precise type of temperature profile versus time applied to the beans can be taken into account. By observing the difference of behaviours of the monitored temperatures $T_1$, $T_2$ during each of these different roasting operations and with the smoke treating unit fully operable, the normal difference of behaviours of said temperatures can be measured and predetermined.

Preferably, the pre-determined threshold depend on the type of the at least one removable filtering device. This selection can be implemented during a step of configuration of the system and in particular of the smoke treating unit. Depending on the type of removable filtering device present inside the smoke filtering device, for example the nature of the adsorbent material or the size of the bag of adsorbent material, the threshold can be modified accordingly. A setting menu in the user interface of the system can enable the input of the type of removable filtering device and the selection of a corresponding pre-determined threshold stored in the memory of the process control of the system or remotely accessible from a server.

The difference of behaviours of the monitored temperatures $T_1$, $T_2$ can be of different types.

In one simplest mode of the method:

in the step of observing the difference of behaviours of the monitored temperatures, the difference $\Delta T$ between said temperatures ($T_1$, $T_2$) is calculated at, at least one time to after the beginning of the operation, and if said difference $\Delta T$ is inferior to a pre-determined temperature threshold $\Delta T_0$, associated to that time $t_0$, then the alarm is displayed.

In this method, the difference of behaviours is observed at, at least one time $t_0$ through the difference $\Delta T$ between said temperatures and by comparison of said difference $\Delta T$ with a pre-determined temperature threshold $\Delta T_0$.

In another preferred mode, in the step of observing the behaviours of the monitored temperatures, the ratio $$\frac{R_2}{R_1}$$

of the rate of rise of the first measured temperature $$R1 = \frac{dT_1}{dt}$$

at a predefined time $t_0$ and the rate of rise of the second measured temperature $$R2 = \frac{dT_2}{dt}$$

at set predefined time $t_0$ since the beginning of the operation is calculated, and if said ratio $$\frac{R_2}{R_1}$$

is inferior to a pre-determined threshold $R_{2/1}$, then the alarm is displayed.

In general, compared to the simple difference of temperatures, the rates of rise present the advantage of being less prone to environmental conditions, to the roasting profile applied to the coffee beans during the roasting operation or even to the fact that some previous roasting operations have already heated the filtering device. Another advantage is that the analysis of the rate of rise enables an earlier detection of the missing filtering device and the roasting operation can be stopped immediately before the peak of VOCs and PMs appear.

When the step of operating the roasting apparatus in order to produce hot gas is a coffee beans roasting operation, then preferably, the rates of rise ($R_1$, $R_2$) are calculated at a time that is before the time the peak of emissions of VOCs and PMs of the beans happens.

This moment can vary depending on the type of beans roasted in the roasting apparatus such a green beans or partially pre-roasted beans that is beans having been obtained by heating green coffee beans and stopping said heating process before the end of the first crack. Advantageously, the roasting can even be stopped and re-started after installation of the missing filtering device.

In one preferred embodiment, the first temperature sensor of a couple is positioned just upstream one removable filtering device and the second temperature sensor of said couple is positioned just downstream said removable filtering device according to the flow of smoke or hot gas.

This embodiment provides precise information about the removable filtering device placed between the two temperature sensors of the couple, for example one active carbon filter comprising one removable bag of active carbon.

In this preferred embodiment, preferably the ratio $$\frac{R_2}{R_1}$$

of the rate of rise of the first measured temperature $$R1 = \frac{dT_1}{dt}$$

at a predefined time $t_0$ and the rate of rise of the second measured temperature $$R2 = \frac{dT_2}{dt}$$

at said predefined time $t_0$ is calculated from the beginning of the roasting operation, and if the ratio $$\frac{R_2}{R_1}$$

is close to 1, preferably superior to a pre-determined threshold, said threshold being inferior to 1, then the alarm is displayed.

A ratio $$\frac{R_2}{R_1}$$

that is a little bit inferior to 1 corresponds to a ratio close to 1 since the flow smoke or hot gas always reaches the second temperature after the first temperature sensor. A ratio close to 1 reflects the fact that the flow of smoke is not retained inside the filtering device due to the absence of the latter. Accordingly, the value of 1 can be set by default and the term “close” can be defined according to the configuration of the smoke treating unit and the positions of the temperature sensors.

In one preferred embodiment, if the ratio $$\frac{R_2}{R_1}$$

is superior to a pre-determined threshold, said threshold being inferior to 1, during the beginning of the operation, then the alarm is displayed.

Usually the pre-determined threshold, to which the ratio $$\frac{R_2}{R_1}$$

is compared, is set based on experimental data. This threshold is usually linked to the type of smoke filtering unit, the presence of other types of filters inside the unit, in particular upstream, the internal design of the smoke treating unit and the filtering device.

In a particular embodiment of this preferred embodiment, the smoke treating unit can comprise:

- several removable filtering devices, said filtering devices being positioned in series according to the direction of the flow of smoke inside the smoke treating unit, and
- several couples of a first and a second temperature sensors, each couple being associated to one dedicated removable filtering device, the first temperature sensor of said couple being positioned just before said dedicated removable filtering device and the second temperature sensor of said couple being positioned just after said dedicated removable filtering device according to the direction of the flow of smoke or hot gas.

Accordingly, precise information can be obtained about these filtering devices with dedicated couples of sensors, for example two different active carbon filters.

In another embodiment:

- the smoke treating unit can comprise several removable filtering devices, said filtering devices being positioned in series according to the direction of the flow of smoke inside the smoke treating unit, and
- for at least one couple of temperature sensors:
  - the first temperature sensor is positioned to measure the temperature $T_1$ of the flow of smoke upstream at least two removable filtering devices, and
  - the second temperature sensor is positioned to measure the temperature $T_2$ of the flow of smoke downstream said at least two removable filtering devices.

With this embodiment, one couple of temperature sensors can be used to provide global information about all the filtering devices positioned between each sensor of this couple. For example, the first sensor can be positioned at the inlet of the smoke treating unit and the second sensor can be positioned at the outlet of the smoke treating unit.

In another embodiment, the system can comprise:

- several smoke treating units, each of said smoke treating units being configured to conduct and treat at least a part of the smoke through a dedicated path, and
- an inlet ducting device to guide smoke emitted by the at least one roasting apparatus to at least one of the smoke treating units,
- an outlet ducting device to guide smoke treated by the smoke treating units to an outlet of the system, and
- for at least one couple of temperature sensors:
  - the first temperature sensor is positioned to measure the temperature $T_1$ of the flow of smoke upstream said inlet ducting device, and
  - the second temperature sensor is positioned to measure the temperature $T_2$ of the flow of smoke downstream said outlet ducting device.

Within this embodiment, the system comprises several smoke treating units able to treat the smoke of at least one roasting apparatus. Each smoke treating unit defines a specific path for smoke, usually define by ducting means. One couple of temperature sensors can be used to provide global information about all the smoke treating units positioned between each sensor of this couple.

In a second aspect, there is provided a system for roasting coffee beans, said system comprising:

- at least one roasting apparatus, and
- at least one smoke treating unit configured to treat at least a part of the flow of smoke produced by the at least one roasting apparatus, said smoke treating unit comprising:
  - at least one removable filtering device, and
  - at least one couple of a first and a second temperature sensors, the first temperature sensor being configured to measure the temperature $T_1$ of the flow of smoke upstream said removable filtering device and the second temperature sensor configured to measure the temperature $T_2$ of the flow of smoke downstream said removable filtering device, and
- a smoke driver configured to drive smoke produced by the roasting apparatus through the smoke treating unit,
- a control system operable to perform the method such as described above.

Preferably, the roasting apparatus can comprise a display unit in order to display the alarm which can be visual and/or a sound.

Preferably, the smoke treating unit comprises at least one the removable filtering device that is cleanable, disposable or able the be regenerated, preferably comprised in the list of: a metallic sieve, an electrostatic precipitator, a HEPA filter, paper, cloth and/or cotton filter, an adsorbent material filter and combinations thereof.

Preferably, the smoke filtering sub-unit comprises successively, according to the direction of the flow of the smoke inside the smoke treating unit, at least one filter to remove particulate matters and then an electrostatic precipitator and then the active carbon filter. This order prevents the active carbon filter from being clogged by particulate matters.

The smoke driver is generally a fan driving the smoke to the outlet.

Preferably the fan is positioned next to the outlet of the smoke treating unit. As a result, the fan is not contaminated by the non-treated smoke and its maintenance is easier.

According to one preferred embodiment, the smoke filtering sub-unit comprises at least successively:

- a metallic mesh, then
- an electrostatic precipitator, and then
- the active carbon filter according to the movement of the flow of the smoke inside the smoke treating unit.

Preferably within this embodiment, the active carbon filter is positioned physically above the electrostatic precipitator. Accordingly, the smoke is introduced upwardly through the successive devices.

Depending on the integration of the roasting apparatus and the smoke treating unit, the control system can be shared between both apparatuses and the steps of the method can be shared between the processing units of at least these two apparatuses.

In one embodiment, the method can be executed by the processing unit of the roasting apparatus and by the processing unit of the smoke treating unit, both processing units communicating together. In particular:

- the processing unit of the smoke treating unit can implement the steps of:
  - monitoring the first and the second temperatures, observing and comparing the observed difference of behaviours to a predetermined difference of behaviours, if necessary ordering the display of an alarm to the roasting apparatus, the processing unit of the roasting apparatus can implement the steps of:

operating the roasting apparatus in order to produce hot gas, displaying the cleaning alarm.

In another embodiment, the processing unit of the smoke treating unit can implement the steps of:

monitoring the first and the second temperatures, communicating the values of said monitored temperatures to the roasting apparatus, and the processing unit of the roasting apparatus can implement the steps of:

operating the roasting apparatus in order to produce hot gas, observing and comparing the observed difference of behaviours to a predetermined difference of behaviours, if necessary displaying the cleaning alarm.

In another embodiment, the processing unit of the smoke treating unit can implement all the steps, except the operation of the roasting apparatus in order to produce hot gas, after receiving information that said operation is starting from the roasting apparatus.

Preferably, the roasting apparatus can comprise a display unit in order to display the alarm. Alternatively, the smoke treating unit can comprise a device to display the alarm such as a lighting button and/or a sound and/or a voice message.

In another alternative, the control system can be configured to display the alarm on a mobile device in communication with the system.

In a third aspect, there is provided a computer program comprising instructions to cause the above system to perform the method such as described above.

In one embodiment, the computer program can be executed by the processing unit of the roasting apparatus and by the processing unit of the smoke treating unit, both processing units communicating together.

In particular:

the processing unit of smoke treating unit can implement the steps of:

comparing the behaviours of the first and the second temperatures, and if necessary ordering the display of an alarm to the roasting apparatus, the processing unit of the roasting apparatus can implement the steps of:

operating the roasting apparatus in order to produce hot gas, displaying the alarm.

In another embodiment, the processing unit of the smoke treating unit can implement the steps of:

monitoring the first and the second temperatures, communicating the values of said monitored temperatures to the roasting apparatus, and the processing unit of the roasting apparatus can implement the steps of:

operating the roasting apparatus in order to produce hot gas, observing and comparing the observed difference of behaviours to a predetermined difference of behaviours, if necessary displaying the cleaning alarm.

In another embodiment, the processing unit of the smoke treating unit can implement all the steps, except the operation of the roasting apparatus in order to produce hot gas, after receiving information that said operation is starting from the roasting apparatus.

In a fourth aspect, there is provided a computer readable storage medium having stored thereon the above computer program.

In the present application, the term "several" means at least two.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

System for Roasting

Figures 1, 2:
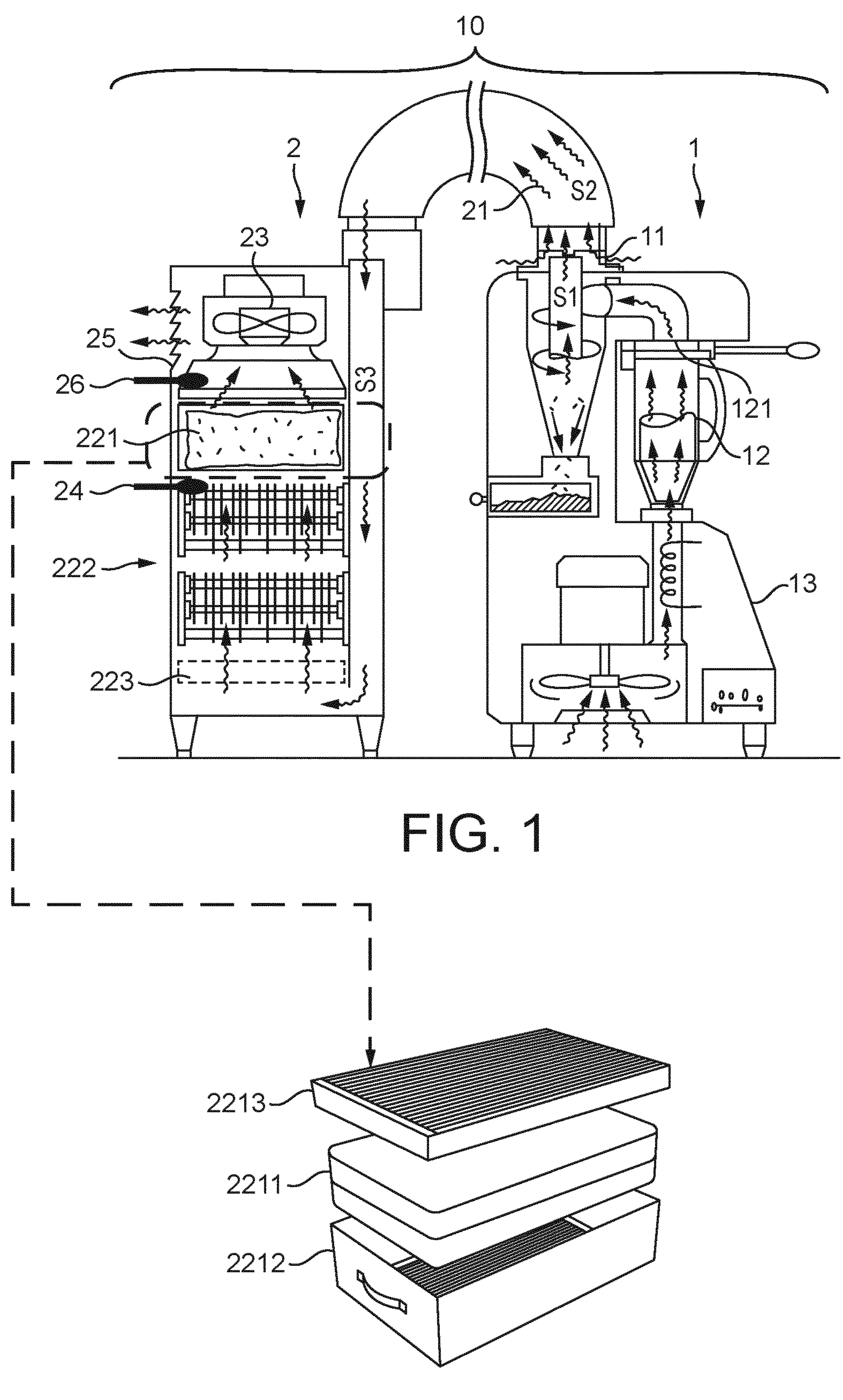
FIG. 1 is a view of a system according to the present invention illustrating the path of the smoke through the system.
FIG. 2 illustrates the active carbon filter of the smoke treating unit of FIG. 1.

FIG. 1 shows an illustrative view of a system of a roasting apparatus 1 and a smoke treating unit 2. Functionally, the roasting apparatus is operable to roast coffee beans and the smoke treating unit is operable to treat the smoke generated during roasting by the roasting apparatus.

Roasting Apparatus

The roasting apparatus 1 is operable to receive and roast coffee beans inside a roasting chamber 12.

Preferably, the roasting apparatus 1 comprises a roasting chamber 12 in which a flow of hot air is introduced to agitate and heat the beans. The hot air flow is usually produced by an air flow driver and a heater. These devices are positioned below the roasting chamber and introduce the flow of hot air through the bottom of the chamber. In the illustrated figure, the bottom of the chamber is configured to enable air to pass through, specifically it can be a perforated plate on which the beans can lie and through which air can flow upwardly.

The air flow driver is operable to generate a flow of air upwardly in direction of the bottom of the vessel. The generated flow is configured to heat the beans and to agitate and lift the beans. As a result, the beans are homogenously heated. Specifically, the air flow driver can be a fan powered by a motor. Air inlets can be provided inside the base of the housing in order to feed air inside the housing, the air flow driver blowing this air in direction of the chamber 12. The heater is operable to heat the flow of air generated by the air flow driver. Preferably, the heater is an electrical resistance positioned between the fan and the perforated plate with the result that the flow of air is heated before it enters the chamber 12 to heat and to lift the beans. The heater and/or the fan are operable to apply a roasting profile to the beans, this roasting profile being defined as a curve of temperature against time.

Preferably, the roasting apparatus comprises a user interface 13 enabling:

- the input of information about the roasting, in particular the quantity of beans introduced inside the roasting chamber and the desired level of roasting, and the output of information about the roasting operation (status, temperature, time) and
- preferably about the output of information about the smoke treating unit 2 in particular about the cleaning of the electrostatic precipitator 222.

The roasting of the beans generates a smoke that is driven to the top opening 121 of the roasting chamber due to the flow of air generated by the air flow driver and as illustrated by arrow S1 in FIG. 1.

Generally a chaff collector is in flow communication with the top opening 121 of the chamber to receive chaffs that have progressively separated from the beans during roasting and due to their light density are blown off to the chaff collector.

The rest of the smoke is evacuated through the smoke outlet 11 at the top of the roasting apparatus.

Smoke Treating Unit

The smoke treating unit 2 is operable to receive and treat the smoke S1 emitted at the smoke outlet 11 of the roasting apparatus.

First, the smoke treating unit 2 comprises a smoke collecting device 21 adapted to collect the smoke. This smoke collecting device 21 or collecting device forms an internal void space or duct guiding the smoke (dotted lines S1, S2, S3) from the outlet 11 of the roasting apparatus in direction of the filtering devices of the smoke filtering sub-unit 22.

The smoke filtering sub-unit 22 comprises an active carbon filter 221 adapted to remove VOCs from the smoke.

FIG. 2 illustrates the main components of this active carbon filter 221. The filter comprises a box 2212 configured to hold the adsorbent material, that is preferably active carbon. Since this adsorbent is usually in the form of granules, the adsorbent is hold in a holder 2211 of which wall enables smoke to pass through freely. Usually this holder is a bag of plastic mesh. The top and bottom walls of the box are simple grids enabling the smoke to pass through freely while retaining the holder inside the box. The box 221 is removeable from the smoke filtering unit for maintenance. A handle on one side wall enables the operator to withdraw the box. Once removed from the unit, the cover 2213 can be removed to get access to the active carbon holder 2211.

The maintenance operation of the active carbon filter consists in replacing the holder 2211 by a new one. When the adsorbent material has reached its maximum capacity of adsorption, the material must be removed to be regenerated. Regeneration cannot be realised on-site. Consequently, the old holder is replaced by a fresh one.

During this maintenance operation, the operator can forget to re-introduce a new holder inside the box before repositioning the box in the unit.

In the particularly illustrated embodiment, the smoke filtering sub-unit 22 can comprise:

- a device 223 adapted for filtering large particulate matter like PM10, for example a metallic mesh and an associated diffuser, generally a metallic grid positioned in front (that is upstream) of the mesh.
- an electrostatic precipitator 222 adapted for filtering small particulate matter.

Preferably, the device for removing particulate matter is positioned upstream the active carbon filter. This upstream position guarantees that particulate matters do not foul the active carbon filter.

Physically, the electrostatic precipitator is positioned below the active carbon filter to avoid that particulates fall from the electrostatic precipitator on the active carbon filter when the electrostatic precipitator is switched off.

The smoke filtering sub-unit 22 comprises a smoke driver 23, generally a fan, for sucking the contaminated smoke from the inlet 211 of the collecting device through the smoke filtering sub-unit 22, where it is treated, to the outlet 25 of the smoke filtering sub-unit 22, where it is dispensed in ambient atmosphere safely.

The smoke filtering sub-unit 22 comprises two temperature sensors 24 and 26 positioned just upstream and just downstream the active carbon filter respectively and configured to measure the temperature of the smoke. In particular, the sensor 26 is a multi-component gas sensor able to measure pressure, temperature and VOCs composition of a gas. It is usually used to analyse the safety of the gas dispensed out of the smoke treating unit, in particular when the gas is dispensed in a public room. The temperature sensor 24 is usually used to control that the temperature of the smoke passing through the active carbon filter 221 is not too high. These two existing sensors can be used to apply the method of the present invention as described below.

Figure 3:
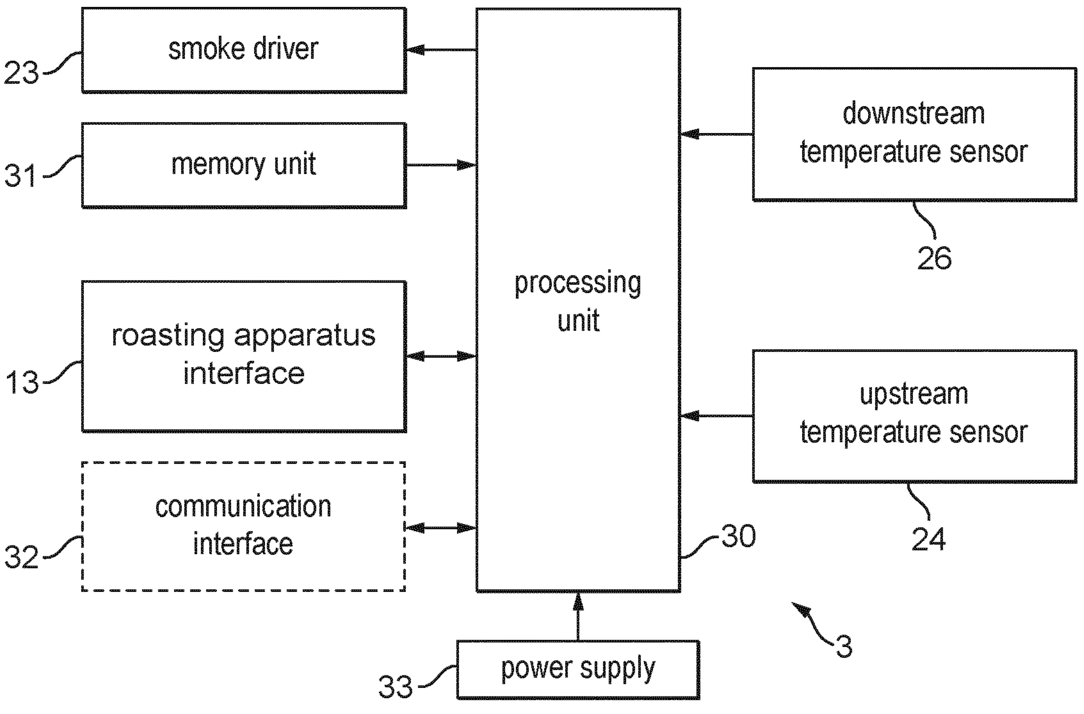
FIG. 3 shows a block diagram of a control system of the system according to FIGS. 1 and 2, FIGS. 4A and 4B illustrate the evolution of monitored temperatures $T_1$ and $T_2$ during a roasting operation with the active carbon holder present or not.

Control System of the System of the Roasting Apparatus and the Smoke Treating Unit With reference to FIGS. 1, 2 and 3, the control system 3 will now be considered: the control system 3 is operable to control the smoke filtering unit 2.

Depending on the level of integration of the roasting apparatus 1 and the smoke filtering unit 2, the control system can be shared between the processing units of these two apparatuses:

- if the smoke treating unit 2 is part of the roasting apparatus 1, usually the processing unit of the roasting apparatus is the master and the processing unit of the filter is the slave.
- if the roasting apparatus 1 and the smoke treating unit 2 form two different apparatuses, each of them with its own processing unit, then these processing units can be configured to communicate to implement the method.

FIG. 3 illustrates the control system of the smoke filtering unit 2 of FIG. 1.

The control system 3 typically comprises at a second level of smoke filtering unit 2: a processing unit 30, a power supply 33, a memory unit 31, optionally a communication interface 32 for remote connection.

The processing unit 30 is configured to output feedback to the user interface 13 of the roasting apparatus in particular to display an alarm related to the detection of the absence of active carbon filter holder inside the active carbon filter. In an alternative configuration, the some treating unit 2 can comprise its own user interface to display this information, for example lighting buttons that can be lighted according to the presence or not of the holder.

The processing unit 30 may also display information to the user interface 13 about:

cleaning instructions, reset of the alarm status warnings, error alarms.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 32 as described below. In that case, at least a part of input and output can be transmitted to the mobile device through the communication interface 32.

The processing unit 30 generally comprises memory, input and output system components arranged as an integrated circuit, typically as a microprocessor or a microcontroller. The processing unit 30 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programmed logic or to additionally comprise programmed logic. The processing unit 30 may also comprise one or more of the aforementioned integrated circuits. An example of the later is several integrated circuits arranged in communication with each other in a modular fashion e.g.: a slave integrated circuit to control the smoke treating unit 2 in communication with a master integrated circuit to control the roasting apparatus 10, a slave integrated circuit to control the user interface 13 in communication with a master integrated circuit to control the roasting apparatus 10

The control system 30 can comprise a communication interface 32 for data communication of the system 10 with another device and/or system, such as a server system, a mobile device. The communication interface 32 can be used to supply and/or receive information related to the coffee beans roasting process, such as roasting process information, type of the beans. The system can also receive information about the characteristics of the removable filtering devices 221 part of the smoke treating unit and in particular the characteristics of the refillable parts of these filtering devices such as the active carbon bag 2211. Depending on the embodiment of the invention, predetermined difference of behaviours or pre-determined threshold related to the use of specific removable filtering devices 221 can be downloaded remotely. Alternatively, such information can be inputted manually by the operator through the user interface. The communication interface 32 may comprise first and second communication interface for data communication with several devices at once or communication via different media.

The communication interface 32 can be configured for cabled media or wireless media or a combination thereof, e.g.: a wired connection, such as RS-232, USB, I2C, Ethernet define by IEEE 802.3, a wireless connection, such as wireless LAN (e.g. IEEE 802.11) or near field communication (NFC) or a cellular system such as GPRS or GSM. The communication interface 32 interfaces with the processing unit 30, by means of a communication interface signal. Generally the communication interface comprises a separate processing unit (examples of which are provided above) to control communication hardware (e.g. an antenna) to interface with the master processing unit 30. However, less complex configurations can be used e.g. a simple wired connection for serial communication directly with the processing unit 30.

The power supply 33 is operable to supply electrical energy to the said controlled components and the processing unit 30. The power 33 may comprise various means, such as a battery or a unit to receive and condition a main electrical supply.

The processing unit 30 generally comprises a memory unit 31 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic. The instructions stored on the memory unit 31 can be idealised as comprising a program to determine the presence of the active carbon filter in the smoke treating unit of the system and the display of an alarm.

The processing unit 30 is configured to output the value of the temperatures $T_1$ and $T_2$ measured by the temperature sensors 24 and 26.

During a roasting operation, the control system 3 is operable:

to monitor the first and the second temperatures measured by one of the couples of a first and a second temperature sensors during at least a period of time of the operation, to observe the difference of behaviours of the monitored temperatures along time, to compare said observed difference of behaviours to a predetermined difference of behaviours corresponding to the presence of said filtering device between the two temperature sensors, if the observed difference of behaviours deviates from the predetermined difference of behaviours, then to display an alarm.

Figure 4A:
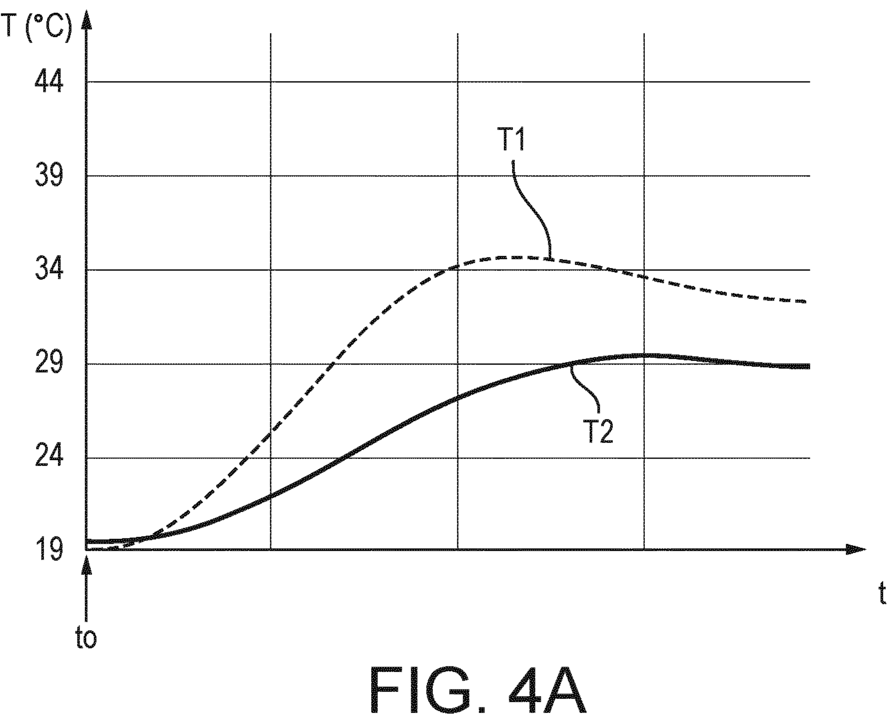
Figure 4B:
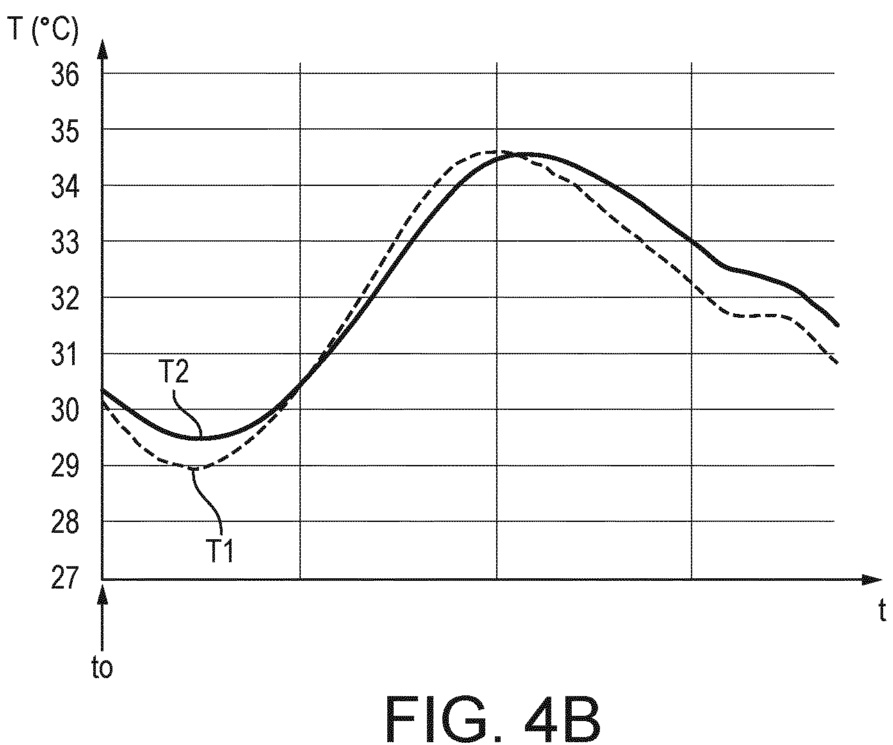

FIGS. 4A and 4B illustrate the behaviours of the temperatures $T_1$ and $T_2$ during the first coffee beans roasting operation implemented after a maintenance operation of the active carbon filter. The time 0 represents the beginning of the roasting operation.

In FIG. 4A, the active carbon holder 2211 is present and it can be observed a discrepancy in the behaviours of the temperatures $T_1$ and $T_2$ measured at each temperature sensors along the time of the roasting operation: the temperature $T_1$ upstream the active carbon filter rises much more rapidly than the temperature $T_2$ downstream the filter. It can be explained by the fact that the active carbon acts as a thermal buffer: thermal energy of the smoke is lost to heat up the active carbon.

On the contrary, in FIG. 4B, it can be observed that, when the active carbon holder 2211 is absent, the behaviours of the temperatures $T_1$ and $T_2$ along the time of the roasting operation are very similar and close one to the other. This observed difference of behaviours of the two temperatures in FIG. 4B, that deviates from the normal difference of behaviours of the two temperatures in FIG. 4A when the filter is in place, can be used to detect the fact that the active carbon holder has not been placed inside the filter and to display a corresponding alarm. The difference of behaviours between $T_1$ and $T_2$ as illustrated in FIG. 4A corresponds to the difference of behaviours that is predetermined by experimentations during the normal roasting operation of coffee beans, preferably starting from a system of a roasting apparatus and a smoke treating unit that is cold.

In one practical and simplest mode, the control system 3 is operable:

- to calculate the difference $\Delta T$ between said temperatures ($T_1$, $T_2$) at least one time $t_0$ after the beginning of the operation, and
- to display an alarm if said difference $\Delta T$ is inferior to a pre-determined temperature threshold $\Delta T_0$ associated to that time $t_0$.

Based on the predetermined situation illustrated in FIG. 4A, during a roasting operation launched just after a recent maintenance operation such as the replacement of the active carbon filter holder 2211, the monitored temperatures are measured. The difference $\Delta T$ between said temperatures $T_1$ and $T_2$ can be calculated at a specific predetermined time to and if said difference is inferior to a corresponding pre-determined temperature threshold $\Delta T_0$, then an alarm is displayed urging the operator to check the presence of the filter inside the smoke treating unit.

Based on the illustrated FIGS. 4A and 4B, it appears that, at the times t' and t", each of the corresponding differences $\Delta T'$ and $\Delta T''$ between the monitored temperatures $T_1$ and $T_2$ in FIG. 4B are inferior to the corresponding differences $\Delta T'$ and $\Delta T''$ between the monitored temperatures $T_1$ and $T_2$ in FIG. 4A. By setting a pre-determined temperature difference threshold $\Delta T_0$ at a corresponding time $t_0$, the difference $\Delta T(t_0)$ between temperatures T1 and T2 at that time to can be compared to that threshold $\Delta T_0$.

Preferably, the time $t_0$ is set a low as possible, while enabling the observation of a difference of temperatures. For example, in the illustrated embodiment, the time $t_0$ can be set at 300 seconds.

The comparison of the difference of temperatures with the threshold $\Delta T_0$ can take into account a certain margin of error due to measure errors (position of the sensors, sensitivity of sensors)

The predefined parameters of time and associated difference of temperatures ($t_0$; $\Delta T_0$) can be made adjustable in the settings of the roasting system. The adjustment can be due to a change in the nature of the carbon filter (e.g. due to a change in procurement of the adsorbent material), a too high or low sensitivity in the display of the alarm, an improvement of the pre-determination of the parameters further to a high number of experimentations in particular by machine learning.

In one preferred mode, the control system 3 is operable:

to calculate the ratio $$\frac{R_2}{R_1}$$

of the rate of rise of the first measured temperature $$R_1 = \frac{dT_1}{dt}$$

and the rate of rise of the second measured temperature $$R_2 = \frac{dT_2}{dt}$$

at the same predefined time $t_0$, and if said ratio $$\frac{R_2}{R_1}$$

is inferior to a pre-determined threshold $R_{2/1}$, then the alarm is displayed.

For example, in a smoke filtering unit such as illustrated in FIG. 1, a predetermined threshold $R_{2/1}$ was set at 0.7 for a time of 300 seconds. The threshold at that time was selected to provide accurate determination of the absence of the active carbon bag and to avoid false alerts for the operator.

Accordingly with a threshold set to 0.7, if the ratio $$\frac{R_2}{R_1}$$

is superior to 0.7 at 300 seconds, the alarm is displayed.

In a similar manner as mentioned above, the predefined parameters of time and ratio $$\left(t0; \frac{R_2}{R_1}\right)$$

can be made adjustable in the settings of the roasting system.

The rate of rise, frequently identified as RoR, is a common parameter deduced from monitored temperature in roasting apparatuses. In the present method, rates of rises $R_1$, $R_2$ are calculated from each of the temperatures $T_1$, $T_2$ monitored at the temperature sensors 24, 26.

Whatever the mode, in general the alarm urges the operator to check the presence of the active carbon filter before any new roasting operation is implemented.

Although illustrated with an active carbon filter, this method can be implemented with other filtering devices in a similar manner.

Figure 5:
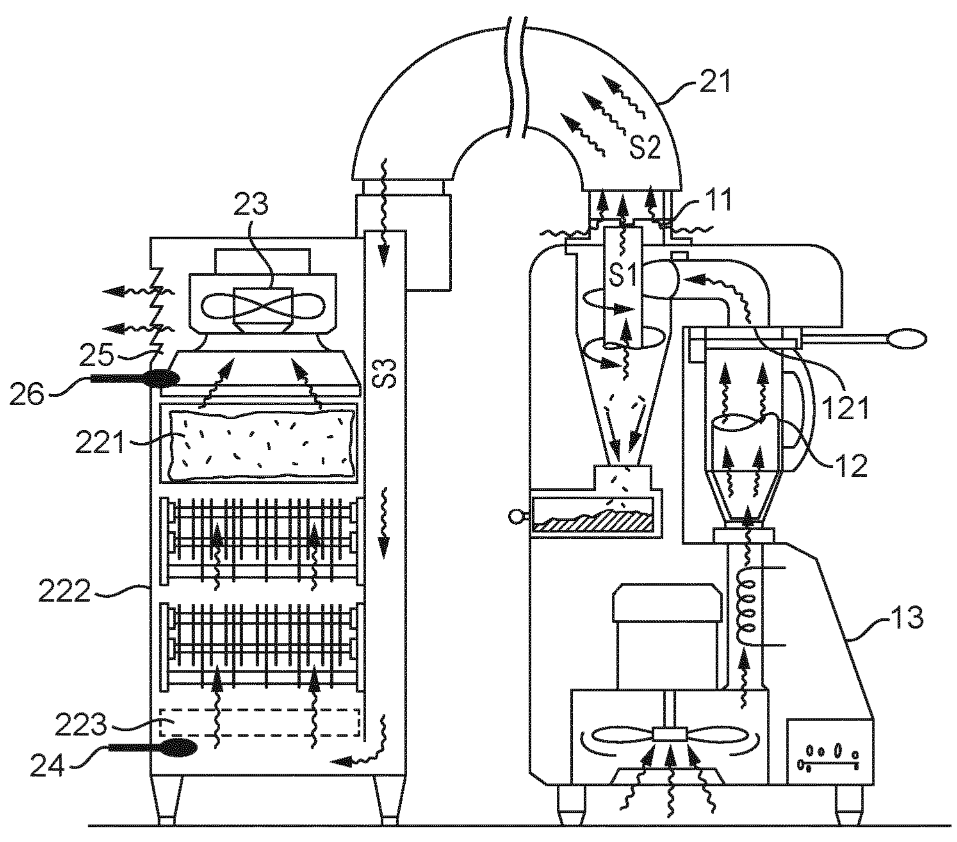
FIGS. 5 and 6 illustrate alternative systems to the one illustrated in FIG. 1.

FIG. 5 illustrates a system similar to the one illustrated in FIG. 1 except that the first temperature sensor 24 is positioned upstream the PM filter 223. Accordingly, the couple of temperature sensors surround the three filtering devices. If further to the maintenance and the removal of the filtering devices 221, 222, 223, one of them is not re-installed inside the smoke treating unit and a roasting operation is launched, then the behaviors of the first and second measured temperatures at the sensors 24 and 26 will be more similar than if the missing filtering device would have be re-installed. Yet in that situation of this particular embodiment, due to the fact that at least two of the three filtering devices are present, the similar behaviours of the temperatures will not be so straightforward as in the embodiment of FIG. 1.

In the embodiment of FIG. 5, the observed difference of behaviours between the monitored temperatures $T_1$ and $T_2$ is compared to a predetermined difference of behaviours corresponding to the presence of the three removable filtering devices 221, 222, and 223 positioned between the two temperature sensors.

These predetermined differences of behaviours is pre-established by experimentation on the system during roasting operations, and preferably starting from a cold system.

If the observed difference of behaviours deviates from the predetermined difference of behaviours, then an alarm is displayed an alarm can be displayed to draw the attention of the operator that one of the three filtering devices 221, 222, 223 may be missing. By opening the smoke treating unit, the operator can rapidly check that risk.

In a particular mode, the deviation can be estimated by comparing the ratio $$\frac{R_2}{R_1}$$

to a pre-determined threshold corresponding to the absence of at least one of the removable filtering device.

As mentioned above, this pre-determined threshold can be stored in the memory 31 of the control system. It can be updated if some of the filtering devices differ from the original setup (change in supply of removable filtering devices for example of the nature or the quantity of adsorbent) either manual input through the user interface (either of the system or of a mobile device) or through a remote server and the communication interface 32.

Figure 6:
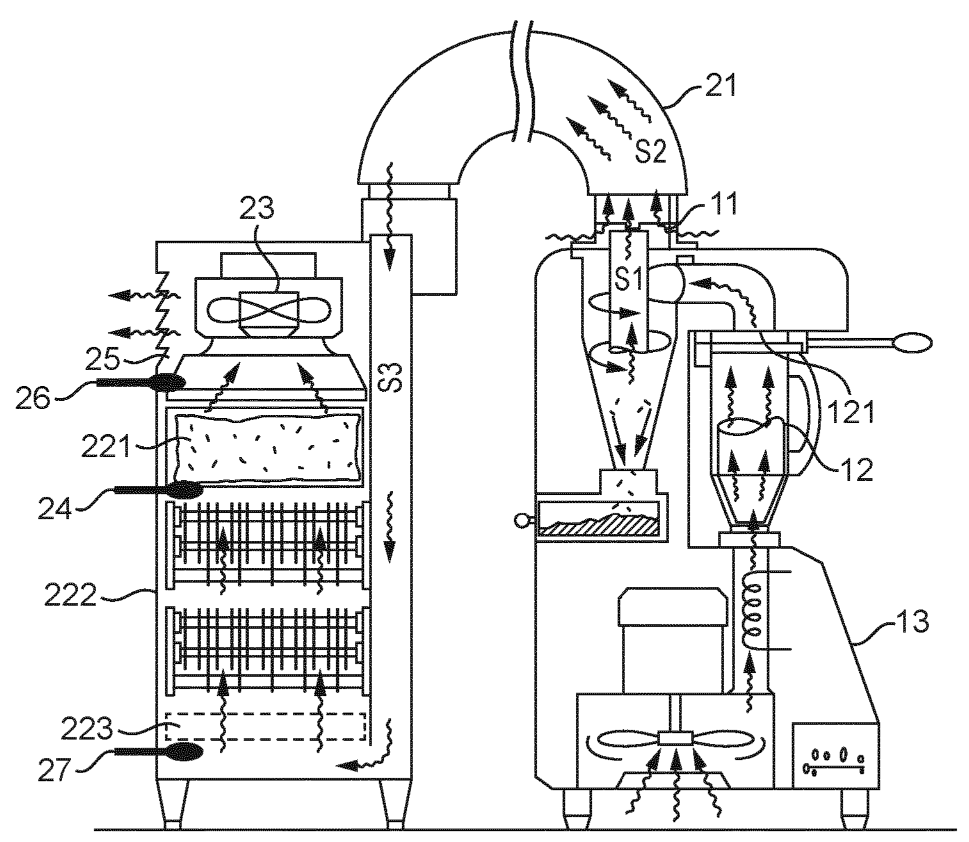

FIG. 6 illustrates a system similar to the one illustrated in FIG. 1 except that a third temperature sensor 27 is positioned upstream the PM filter 223.

Accordingly, it can be considered that the smoke treating unit 3 comprises at least two pairs of temperature sensors:

- one comprising sensors 24 and 26 and enabling the detection of the missing bag of active carbon as mentioned above in relation with FIG. 1, and
- one comprising sensors 24 and 27 and enabling the detection of the one of the electrostatic filter 222 and/or the PM filter 223 positioned between these sensors. If further to the maintenance and removal of these filtering devices 222, 223, one of them is not re-installed inside the smoke treating unit and a roasting operation is launched, then the behaviors of the first and second measured temperatures at the sensors 24 and 27 will be more similar than if the missing filtering device would have be re-installed. The principle described for FIG. 5 applies in the same manner.

Figure 7:
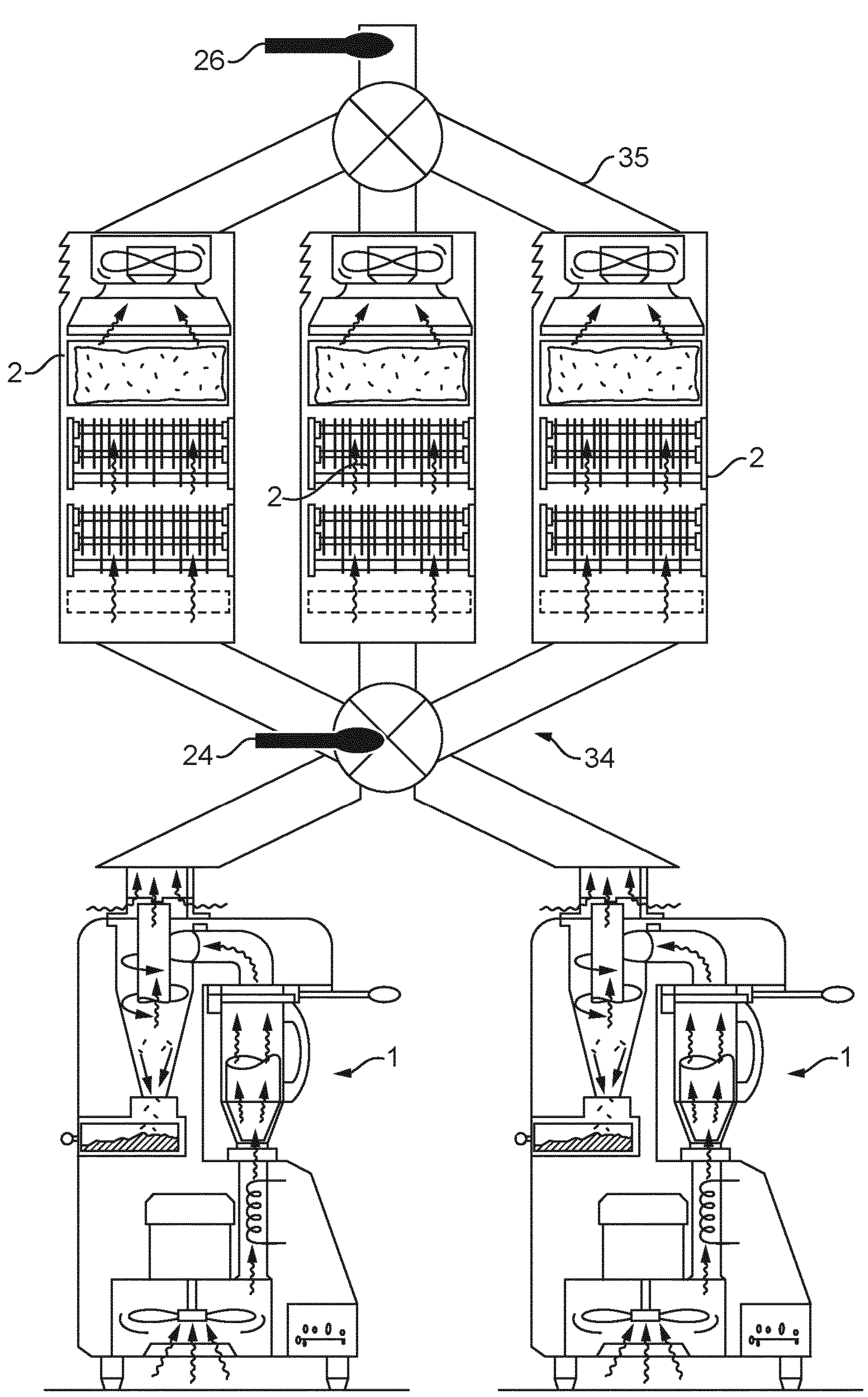
FIG. 7 illustrates a system of several roasting apparatuses and smoke treating units according to the invention.

FIG. 7 illustrates a system comprising several smoke treating units 3. Such a configuration can be adapted to the treatment of an important volume of smoke, for example due to the roasting in two roasting apparatuses 1. The smoke outlets of the roasting apparatuses are connected to an inlet ducting device 34 configured to guide smoke to at least one of the smoke treating units 3. An outlet ducting device 35 is configured to guide smoke treated by the smoke treating units 3 to an outlet of the system. Depending on the volume of emitted smoke, smoke can be sent to one, two or three of the smoke treating units. The temperature sensors 24, 26 are positioned at the inlet and outlet ducting devices and enable the detection of a missing filtering device in at least one of the smoke treating units 3 in a similar manner as in FIG. 5.

One advantage of the method is that it can be implemented with temperature sensors that are not specifically dedicated to the implementation of that method. Temperature sensors positioned inside the smoke treating unit for other process controls can be used additionally to provide information about the presence of an essential part of the smoke treating unit after a maintenance operation. An error in re-installation can be detected with existing temperature sensors rather than adding sensors specifically dedicated to the detection of the presence of a filtering device such as a sensor establishing contact with the filter (such as a switch contact), an optical sensor, a sensor able to read the field of a magnetic element of the filter, an RFID device able to read an RFID tag of the filter.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 1
smoke outlet 11
roasting chamber 12
top outlet 121
user interface 13
smoke treating unit 2
smoke collecting device 21
smoke filtering sub-unit 22
active carbon filter 221
active carbon holder 2211
box 2212
cover 2213
electrostatic precipitator 222
PM filter 223
smoke driver 23
outlet 25
temperature sensors 24, 26, 27
control system 3
processing unit 30
memory unit 31
communication interface 32
power supply 33
inlet ducting device 34
outlet ducting device 35
system 10

The invention claimed is:

1. A method to check a roasting system, said system comprising:

at least one roasting apparatus, said apparatus producing smoke during the heating of coffee beans, and at least one smoke treating unit configured to treat at least a part of the flow of smoke produced by the at least one roasting apparatus, said smoke treating unit comprising at least one removable filtering device, a smoke driver configured to drive smoke from the roasting apparatus to said at least one filtering device, wherein the at least one smoke treating unit comprises at least one couple of a first and a second temperature sensors, the first temperature sensor being configured to measure the temperature T1 of the flow of smoke upstream said at least one removable filtering device and the second temperature sensor configured to measure the temperature T2 of the flow of smoke downstream said at least one removable filtering device, wherein the method comprises the steps of:

operating the roasting apparatus in order to produce hot gas, monitoring the first and the second temperatures measured by one of the couples of a first and a second temperature sensors during at least a period of time of said operation, observing the difference of behaviours of the monitored temperatures along time, comparing said observed difference of behaviours to a predetermined difference of behaviours corresponding to the presence of said at least one removable filtering device between the two temperature sensors, and if the observed difference of behaviours diverges from the predetermined difference of behaviours, then displaying an alarm.

2. Method according to claim 1, wherein the step of operating the roasting apparatus in order to produce hot gas is a coffee beans roasting operation, an operation of pre-warming of the roasting apparatus or an operation of initialization of at least one filtering device.

3. A method according to claim 1, wherein the removable filtering device is cleanable, disposable or able to be regenerated.

4. A method according to claim 1, wherein the predetermined difference of behaviours is selected according to the nature of the at least one removable filtering device positioned between the first and the second temperature sensors of the couple.

5. A method according to claim 1, wherein:

in the step of observing the difference of behaviours of the monitored temperatures, the difference ΔT between said temperatures is calculated at at least one time t0 after the beginning of the operation, and if said difference ΔT is inferior to a pre-determined temperature threshold ΔT0 associated to that time t0 then the alarm is displayed.

6. A method according to claim 1, wherein:

in the step of observing the behaviours of the monitored temperatures, the ratio $$\frac{R_2}{R_1}$$

of the rate of rise of the first measured temperature $$R_1 = \frac{dT_1}{dt}$$

at a predefined time to and the rate of rate of rise of the first measured temperature $$R_2 = \frac{dT_2}{dt}$$

at said predefined time t0 is calculated, and if said ratio $$\frac{R_2}{R_1}$$

is inferior to a pre-determined threshold R2/1, then the alarm is displayed.

7. A method according to claim 1, wherein the first temperature sensor of a couple is positioned just upstream one removable filtering device and the second temperature sensor of said couple is positioned just downstream said removable filtering device according to the flow of smoke.

8. A method according to claim 7, wherein said removeable filtering device is an adsorbent material filter, said filter comprising a removable adsorbent material bag, preferably an active carbon bag.

9. A method according to claim 7, wherein the ratio $$\frac{R_2}{R_1}$$

of the rate of rise of the first measured temperature $$R_1 = \frac{dT_1}{dt}$$

at a predefined time t0 and the rate of rise of the second measured temperature $$R_2 = \frac{dT_2}{dt}$$

at said predefined time t0 is calculated, and if the ratio $$\frac{R_2}{R_1}$$

is close to 1, preferably superior to a pre-determined threshold, and said threshold being inferior to 1, then the alarm is displayed.

10. A method according to claim 1, wherein the smoke treating unit comprises:

several removable filtering devices, said filtering devices being positioned in series according to the direction of the flow of smoke inside the smoke treating unit, and several couples of a first and a second temperature sensors, wherein each couple is associated to one dedicated removable filtering device, the first temperature sensor of said couple being positioned just before said dedicated removable filtering device and the second temperature sensor of said couple being positioned just after said dedicated removable filtering device according to the direction of the flow of smoke.

11. A method according to claim 1, wherein:

the smoke treating unit comprises several removable filtering devices, said filtering devices being positioned in series according to the direction of the flow of smoke inside the smoke treating unit, and for at least one couple of temperature sensors:

the first temperature sensor is positioned to measure the temperature T1 of the flow of smoke upstream at least two removable filtering devices, and the second temperature sensor is positioned to measure the temperature T2 of the flow of smoke downstream said at least two removable filtering devices.

12. A method according to claim 1, wherein the system comprises:

several smoke treating units, each of said smoke treating units being configured to conduct and treat at least a part of the smoke through a dedicated path, and an inlet ducting device to guide smoke emitted by the at least one roasting apparatus to at least one of the smoke treating units, an outlet ducting device to guide smoke treated by the smoke treating units to an outlet of the system, and for at least one couple of temperature sensors:

the first temperature sensor is positioned to measure the temperature T1 of the flow of smoke upstream said inlet ducting device, and the second temperature sensor is positioned to measure the temperature T2 of the flow of smoke downstream said outlet ducting device.

13. A system for roasting coffee beans, said system comprising:

at least one roasting apparatus, and at least one smoke treating unit configured to treat at least a part of the flow of smoke produced by the at least one roasting apparatus, said smoke treating unit comprising:

at least one removable filtering device, and at least one couple of a first and a second temperature sensors, the first temperature sensor being configured to measure the temperature T1 of the flow of smoke upstream said removable filtering device and the second temperature sensor configured to measure the temperature T2 of the flow of smoke downstream said removable filtering device, and a smoke driver configured to drive smoke produced by the roasting apparatus through the smoke treating unit, and a control system operable to perform a method comprising the steps of:

operating the roasting apparatus in order to produce hot gas, monitoring the first and the second temperatures measured by one of the couples of a first and a second temperature sensors during at least a period of time of said operation, observing the difference of behaviours of the monitored temperatures along time, comparing said observed difference of behaviours to a predetermined difference of behaviours corresponding to the presence of said at least one removable filtering device between the two temperature sensors, and if the observed difference of behaviours diverges from the predetermined difference of behaviours, then displaying an alarm.

* * * * *